Jan. 5, 1965

C. J. NUTTALL, JR 3,164,140

COOLING HEAT TURBINE FOR ENGINES

Filed Aug. 2, 1963

INVENTOR.
CLIFFORD J. NUTTALL, JR.

BY
Davis, Hoxie, Faithfull & Hapgood
ATTORNEYS.

United States Patent Office 3,164,140
Patented Jan. 5, 1965

3,164,140
COOLING HEAT TURBINE FOR ENGINES
Clifford J. Nuttall, Jr., Rock Hall, Md., assignor to Stevens Institute of Technology, Hoboken, N.J., a corporation of New Jersey
Filed Aug. 2, 1963, Ser. No. 306,973
4 Claims. (Cl. 123—41.65)

This invention relates to cooling systems for high performance internal combustion engines, and in particular to an air compressing turbine unit for the engine cooling air which derives its motivating energy from waste heat products developed within the engine. This application is a continuation-in-part case based on the applicant's United States patent application Serial No. 102,241, of the same title, filed April 11, 1961 and now abandoned.

It is known that internal combustion engines may be air-cooled. In conventional air-cooled engines this is accomplished by increasing the air flow across the engine body by the use of a fan which derives its motivating energy from a power take-off from the output system of the engine. It is known that the heat absorption characteristic of air, at atmospheric pressure, increases in accordance with the 1.75 power of the air velocity, while the mechanical power required for the fan or blower increases in accordance with the cube, or third power, of the velocity.

It is also known that the heat absorption characteristic of the cooling air may be increased by increasing the pressure of the cooling air above the atmospheric equilibrium. In this case the absorption characteristic increases directly in proportion to the increase in density of the cooling air, and the heat transfer coefficient increases in accordance with the 0.75 power of the density. Thus, the total heat absorbed increases in accordance with the 1.75 power of the density. However, in this case the blower power input requirement increases, within the range of feasible pressures, in accordance with the first power of the pressure times a factor of about two.

That the heat transfer coefficient or characteristic of air varies in accordance with the 0.75 power of the density may be demonstrated mathematically in accordance with the equations founds on page 591 of Hutte, vol. 1, 27th edition, 1949 (Handbook in German) as follows:

Heat transfer rate $= \alpha$ or $h_m = C(P_e)^{.75} \frac{\lambda}{L_0}$

Substituting for $P_e$ the Peclet Equation, $$P_e = \frac{wL_0 \rho g C_p}{\lambda}$$

$$h_m = C\left(\frac{wL_0 \rho g C_p}{\lambda}\right)^{.75} \frac{\lambda}{L_0}$$

$$h_m = C\left(\frac{L_0 h C_p}{\lambda}\right)^{.75} \frac{\lambda}{L_0}$$

$C_1, C$ = constants
$C_p$ = specific heat at constant pressure
$\rho$ = air density .75
$w$ = air velocity
$L_0$ = length
$g$ = acceleration of gravity
$\lambda$ = heat flow along the path of heat transmission
or, $h_m = C_1(w\rho)^{.75}$ expressed in B.t.u./sq. ft./hr./deg. F.

The heat absorption characteristic of the system is determined from the standard equation $Q = h_m A \Delta T$ where $h_m$ is determined as above, $A =$ the area of the radiating surface, and $\Delta T$ is the difference between the temperature of the radiating surface and the average temperature of the air flowing thereover.

It is to be noted that if the mass of air flowing past the heated surface were doubled by either doubling the velocity or density, the $\Delta T$ term would vary since substantially twice as much heat would be removed from the system. Thus the $\Delta T$ term of the equation varies in accordance with the first power of the density and velocity of the air. the $\Delta T$ may then be written as $\Delta T = C_3(w,\rho)$. Combining the equation yields $Q = C_1(w,\rho)^{.75} C_3(w,\rho)$. A as expressed in B.t.u./hour or $Q = C_1 C_3 A (w,\rho)^{1.75}$. From this it may be seen that the quantity of heat removed from the system varies in accordance with the 1.75 power of the velocity or density of the air. To change the pressure, and consequently the density of the cooling air, results in a change in the required horse power in accordance with the formula:

$$H.P. = \frac{\text{Volume } (P_2 - P_1)}{33,000}$$

Thus the H.P. increases in accordance with the first power of the pressure. The resulting additional increase in volume will approximately double so that the additional power required will be approximately 2 times the first power of the pressure increase, whereas, as stated above, to obtain the same cooling effectiveness by increasing the velocity alone requires a third power increase in blower driving power.

Systems combining both higher density and higher velocity may be used to increase the cooling efficiency, at the expense of a considerable increase in blower input power. The energy level of the cooling air itself is considerably increased by absorption of the heat extracted from the engine cylinders, and only a small proportion of this absorbed heat is lost by dissipation through the outer walls of the cooling shrouds.

The present invention utilizes this energy in the cooling air exhaust (or the portion of it not utilized for other purposes, such as heating passenger compartments in a vehicle) to power an air turbine which may be used to drive the air induction blower. Sometimes the air turbine will have sufficient reserve power to drive auxiliary engine devices such as electrical generators and air compressors and to supply power to the output shaft of the engine. According to a further feature of this invention, exhaust gas from an engine, preferably from the cylinders of the engine which is cooled by the system, is combined with the cooling air exhaust and delivered to the air turbine to recover additional energy therefrom.

These and other features of my invention will become evident when considered with the following specification, of which:

Figure 1:
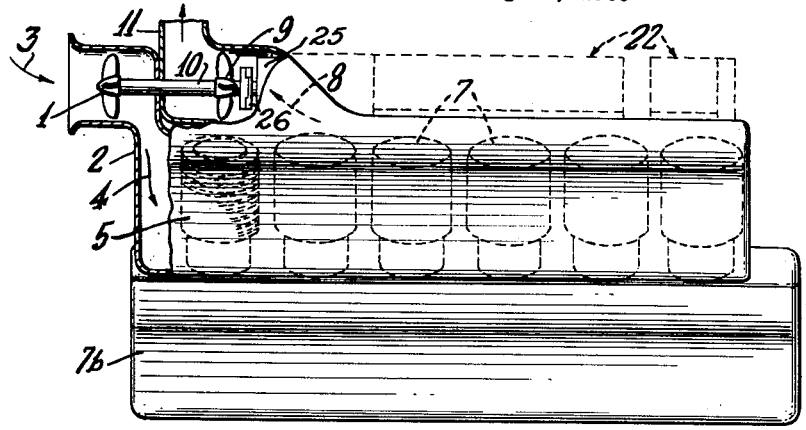
FIG. 1 is a schematic side view of an engine unit embodying the invention as seen from the side of the unit.
Figure 2:
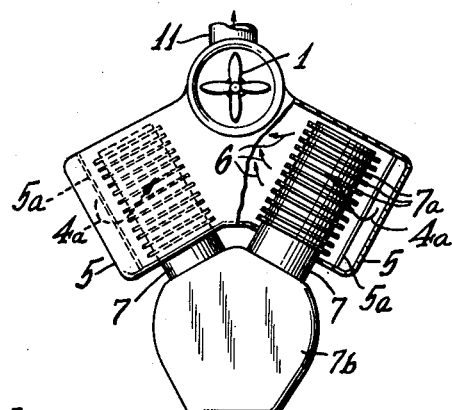
FIG. 2 is a schematic view of the engine of FIG. 1 as seen from the front end of the unit.

In reference to FIGS. 1 and 2, an induction blower 1 in the form of a rotary fan is located in a duct 2 and draws outside air into this duct as indicated by arrow 3. The air is forced by blower 1 in the direction of the arrow 4 into a shroud or plenum 5 where it is caused to flow, by means of baffles 5a, in the direction of arrows 4a through the cooling fins 7a of cylinders 7. The pistons (not shown) in these cylinders are connected in the customary manner to the usual crankshaft (not shown) in housing 7b. From fins 7a, the air is directed, as shown by the arrows 6 and 8, to the portion of the shroud or plenum 5 containing a turbine 9 which is connected directly by shaft 10 to the induction blower 1.

An electric starting motor 25 is connected to shaft 10 to start the shaft's rotation when the engine is started. The blower 1 attains sufficient speed to blow the outside air in and through the cooling system. After the cylinders heat up from their driving of the crankshaft, sufficient heat is imparted to the incoming air and its energy delivered to the turbine 9 so that the turbine 9 can drive shaft 10 without help from the starting electric motor. The electric starting motor is then disconnected from the blower shaft 10, for example by an electric clutch 26, fly-wheel operated clutch, or over-drive clutch, so that the turbine 9 turns the shaft 10.

All the embodiments described herein have a starting device which is disconnected when the turbine starts to drive the blower shaft. Another type of suitable starting device is an over-running clutch or a disconnectable clutch connected between the crankshaft and the blower shaft. The starting device, either the separate electric starting motor or the clutch to the crankshaft, is sufficiently strong so that the blower blows air through the cooling system regardless of the physical position of the engine and its shroud.

In the drawings of the turbine impeller 9 is illustrated in schematic form rather than in any specific form. There are numerous configurations of turbine impellers which satisfy the requirement of converting the inherent gas energy to mechanical energy, and such selection is a matter of optimum design choice on the part of the engineer. For example, see Goodenough, Principles of Thermodynamics, pg. 202 (1920). The blower 1 is a propeller, see Marine Engineers' Handbook, pg. 1408 (1945).

The outside air entering the cooling system, as shown at 3, is under atmospheric pressure and energy; and it leaves the system, through an exhaust duct 11 serving as an outlet from turbine 9, with only that speed which is necessary to dissipate it to the outside or to conduct it through ducts for other heating purposes. The exhaust air from duct 11 leaves the system at a temperature only slightly higher than that of the ambient air, unless it is desired to be higher for heating or other purposes. When the steady state condition is considered after the engine has started, the air flows from the blower 1 at the inlet, over the cooling fins 7a, and out through the exhaust turbine 9. The expansion of the air due to the addition of heat will result in increased velocity down stream of the point of heat addition rather than in an increased pressure consequent return flow.

In a conventional system without the turbine 9, the exhaust air would contain a large portion of the energy imparted to it by the input blower and would also contain the energy derived from the heat extracted from the engine, diminished only by that small amount of heat energy radiated and conducted through the outer walls of the shroud 5. In the embodiment described, however, the exhaust air leaving the driving turbine 9 has such a low residual energy that the energy balance of the system is essentially positive. The energy of the cooling air given up due to internal friction is not lost since it is transformed into heat.

Figures 3, 4:
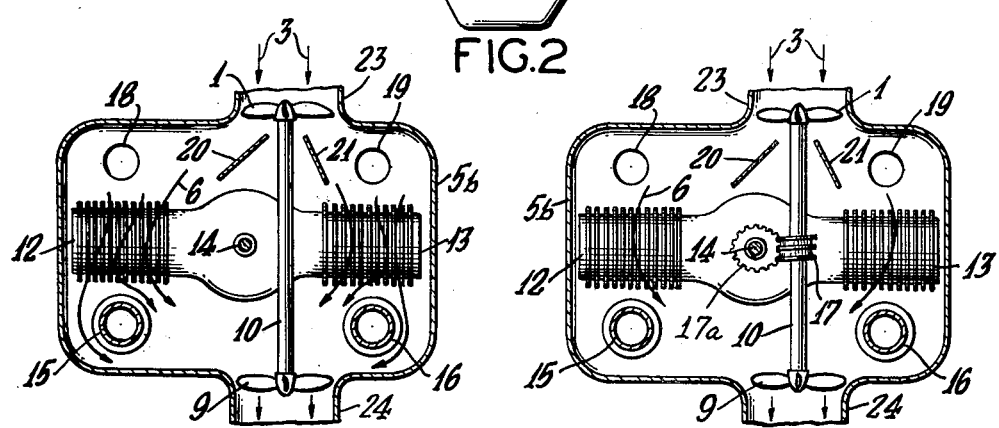
FIG. 3 is a top sectional view of an engine unit embodying a modification of the arrangement of FIG. 1.
FIG. 4 is a view similar to FIG. 3 but showing a further modification.

The energy balance may be made even more positive by including exhaust manifolds, suitably finned, inside the cooling shroud to add their heat energy to the system, as illustrated in FIG. 3. In the modification there shown, the shroud 5b encompasses the whole engine. The engine has horizontally opposed cylinders 12 and 13 whose pistons are connected to a central crankshaft or power output shaft 14. The shroud 5b has a duct 23 forming an air inlet to blower 1 and also has a duct 24 forming an exhaust outlet from heat turbine 9. Exhaust manifolds 15 and 16, externally finned, extend through the outlet side of the plenum chamber and through opposed walls of the shroud, in which they are sealed. These manifolds receive cylinder exhaust gases, as from cylinders 12-13, so that heat therefrom is added to the air after it has been heated by cylinders 12-13 but before it reaches turbine 9. As an alternative, the cylinder exhaust gases may be vented directly into the shroud 5b so that the heat energy and velocity of the discharge gases may be added to the system. The arrows in FIG. 3 indicate the direction of the air flow through the shroud. Baffles 20 and 21 are disposed to direct the input air over the cylinders and manifolds and maintain proper air circulation.

A further alternative arrangement, similar to that described above in reference to FIG. 3, is illustrated in FIG. 4. In this embodiment it will be seen that the common blower and turbine shaft 10 is mechanically interconnected to the engine output shaft 14 through a worm-and-wheel gearing arrangement 17a. In this case, during the starting and warm-up period, the engine supplies the blower power; but upon reaching operating equilibrium, surplus energy in the blower system is added to the output shaft 14 through turbine 9 and gear 17, increasing the available power output. The mechanical interconnection between the engine shaft 14 and the turbine shaft 10 may be an overrunning clutch in lieu of the gear 17a illustrated, to permit the turbine to over-run the engine output shaft when the power is available to directly drive auxiliary equipment, represented at 22 in FIG. 1, such as electrical generators, compressors or exhaust turbine sets. An overrunning clutch suitable for use in this embodiment of the invention may be of the type illustrated in FIG. 71 on pages 8–51 of Marks' Mechanical Engineers' Handbook, Sixth Edition, modified by the addition of gear teeth on its periphery adapted to mesh with the worm 17 on the shaft 10.

It may be desirable, as shown in FIGS. 3 and 4, to locate the engine air intake ports 18 and 19 in a wall of the shroud at its input side to insure that a sufficient volume of air is available to the engine cylinders for operating the engine under various load conditions. These ports 18 and 19 lead air into the plenum chamber. The cylinders obtain their air from the air within the chamber, that is, the cylinders' air ports are within the chamber.

It may also be desirable to mount the blower and the turbine on different shafts. The starting device, in that case, would be connected to the blower shaft. The turbine shaft would be indirectly connected to the blower shaft, either by gearing or electrically. A suitable electrical connection between the turbine and the blower is provided by having the turbine connected to an electric generator whose power runs a motor connected to the blower shaft. A battery would provide the power for the blower shaft's motor on starting.

The operation of the system of the present invention depends primarily upon the increase of velocity and kinetic energy imparted to the air taken in by blower 1 by the engine heat. During operation, the air flowing from the input blower, over the cooling fins and other heated bodies within the shroud does, as expected, expand. This expansion of the air results primarily in an increased velocity of the air stream somewhat beyond the point of heat addition. The action here is analagous to the action within a gas turbine except that here the heat is supplied by the cylinders and exhaust manifolds rather than by the direct combustion of fuel. The amount of energy imparted to the air exceeds the amount of energy lost by its conversion to rotating power by the turbine. Applicant here utilizes the heat energy products, usually wasted in other systems, to power a turbine which drives the blower. Were the output device a blower rather than a turbine, the pressure would be increased on the output side. But, where the turbine action is employed, the pressure of the gases actually decreases in passing through it, rather than increases. And, as stated before, it is possible to attain a positive energy balance in the system so that surplus mechanical output power is available to drive auixiliary apparatus.

I claim:

1. In combination with a high temperature internal combustion engine having a combustion cylinder driving an engine crankshaft, an air cooling system comprising a shroud which forms a plenum chamber containing at least a substantial part of said cylinder, said chamber having an air inlet for conducting cooling air into the chamber and also having an air outlet for exhausting heated air from the chamber, said chamber forming an air flow path wherein air flowing from the inlet to the outlet is directed past the cylinder to extract heat therefrom, a rotary intake blower mounted in said path adjacent the chamber inlet to force air in through said inlet, a rotary turbine mounted in said path adjacent the outlet to extract energy from the heated air, a rotary power transmitting shaft separate from the said crankshaft and connected to the blower to drive the blower, means connecting the turbine to the blower shaft so that the blower is driven by the turbine, an engine exhaust manifold leading into the plenum chamber in position to heat the air after it has been heated by the cylinder and before it reaches the turbine, starting means to rotate the blower shaft on starting of the engine, and means to disconnect the blower shaft from the said starting means upon attaining sufficient heat in the chamber for the turbine alone to drive the blower shaft.

2. The combination of claim 1 wherein the manifold extends through the chamber so that the exhaust is confined to the manifold in passing through the chamber.

3. The combination of claim 1 wherein the starting means is a clutch connecting the blower shaft to the engine's crankshaft.

4. The combination of claim 1 wherein the starting means is an electric motor and the turbine is directly attached to the blower shaft.

References Cited in the file of this patent
UNITED STATES PATENTS

| | | |
|---|---|---|
| 1,598,867 | Lundelius | Sept. 7, 1926 |
| 2,253,505 | Cantoni | Aug. 26, 1941 |
| 2,767,549 | Martin | Oct. 23, 1956 |

UNITED STATES PATENT OFFICE
CERTIFICATE OF CORRECTION

Patent No. 3,164,140                      January 5, 1965

Clifford J. Nuttall, Jr.

It is hereby certified that error appears in the above numbered patent requiring correction and that the said Letters Patent should read as corrected below.

Column 1, lines 55 to 57, the equation should appear as shown below instead of as in the patent:

$$h_m = C \left( \frac{L_o g C_p}{\lambda} \right) .75 \frac{\lambda}{L_o} (w\rho)$$

column 2, line 7, for "the" read -- The --; column 3, line 48, before "consequent" insert -- and --.

Signed and sealed this 27th day of July 1965.

(SEAL)
Attest:

ERNEST W. SWIDER                            EDWARD J. BRENNER
Attesting Officer                        Commissioner of Patents